United States Patent [19]
Morimoto

[11] Patent Number: 6,115,330
[45] Date of Patent: Sep. 5, 2000

[54] OPTICAL INFORMATION STORAGE UNIT FOR RECORDING AND/OR REPRODUCING INFORMATION ON BOTH THE LANDS AND THE GROOVES OF AN OPTICAL MEDIUM

[75] Inventor: Yasuaki Morimoto, Kawasaki, Japan

[73] Assignee: Fujitsu Limited, Kawasaki, Japan

[21] Appl. No.: 09/108,035

[22] Filed: Jun. 30, 1998

[51] Int. Cl.[7] .................................................. G11B 11/00
[52] U.S. Cl. ............................................. 369/13; 369/112
[58] Field of Search .............................. 369/13, 112, 109, 369/110, 44.23, 44.37, 120, 14, 44.14, 116

[56] References Cited

U.S. PATENT DOCUMENTS

| | | | |
|---|---|---|---|
| 5,831,942 | 11/1998 | Morimoto et al. | 369/13 |
| 5,898,661 | 4/1999 | Morimoto | 369/109 |
| 6,002,653 | 12/1999 | Fukumoto | 369/13 |

FOREIGN PATENT DOCUMENTS

| | | |
|---|---|---|
| 8-7357 | 1/1996 | Japan . |
| 8-339569 | 12/1996 | Japan . |
| 9-115185 | 5/1997 | Japan . |
| 9-128825 | 5/1997 | Japan . |
| 9-161347 | 6/1997 | Japan . |
| 9-204700 | 8/1997 | Japan . |
| 9-212870 | 8/1997 | Japan . |
| 9-212928 | 8/1997 | Japan . |
| 9-270147 | 10/1997 | Japan . |
| 9-282733 | 10/1997 | Japan . |
| 9-288835 | 11/1997 | Japan . |

OTHER PUBLICATIONS

High Density Land & Groove Recording with Modified Optics and PA–MFM Recording; N. Aoyama, Y. Morimoto and T. Miyahara; *The Magnetics Society of Japan;* pp. 233–238; 1996.

*Primary Examiner*—Ali Neyzari
*Attorney, Agent, or Firm*—Greer, Burns & Crain, Ltd.

[57] ABSTRACT

An optical information storage unit records information on and/or reproduces information from both a land and a groove of an optical recording medium which have approximately the same width. The optical information storage unit is provided with a first optical system, including a first light source and a first phase compensation means, detecting light from the land of the optical recording medium, and a second optical system, including a second light source and a second phase compensation means, detecting light from the groove of the optical recording medium. The first and second phase compensation means have mutually different phase compensation quantities.

5 Claims, 4 Drawing Sheets

OPTICAL INFORMATION STORAGE UNIT FOR RECORDING AND/OR REPRODUCING INFORMATION ON BOTH THE LANDS AND THE GROOVES OF AN OPTICAL MEDIUM

BACKGROUND OF THE INVENTION

The present invention generally relates to optical information storage units, and more particularly to an optical information storage unit which records information on and reproduces information from both a land and a groove of an optical recording medium such as a magneto-optic recording medium.

In this specification, an "information storage unit" refers to an apparatus which records information on and/or reproduces information from a recording medium.

Presently, optical recording mediums are popularly used as recording mediums capable of enabling reproduction of audio signals and image signals therefrom. Particularly, active research and development are made with respect to magneto-optic recording mediums and phase change recording mediums, as rewritable high-density recording mediums.

Two techniques are conceivable in order to improve the recording density of the optical recording medium which records information spirally or concentrically, namely, reducing the track pitch and improving the linear recording density. In either case, the recording density can be improved by shortening the output wavelength of a semiconductor laser which is used for the recording and reproduction. However, a green or blue semiconductor laser which produces an output having a short wavelength and can continuously oscillate stably at room temperature is unlikely to be put on the market at a low cost for still some considerable time. Under such circumstances, there are demands to realize a method of greatly improving the recording density by using the laser which produces an output having the presently available wavelength, such as a magnetic super resolution (MSR) proposed for the magneto-optic recording medium.

In the case of a RAM medium such as the magneto-optic recording medium, light having the same wavelength is used both at the time of recording information and at the time of reproducing information. On the other hand, in the case of a ROM medium which is prerecorded with information, phase pits are formed using a gas laser or the like which produces an output having a short wavelength. Hence, the reproducing conditions are the same for the RAM medium and the ROM medium, but the RAM medium is disadvantageous compared to the ROM medium from the point of view of recording the information with a high density, because the recording of the RAM medium requires a light source which will only be available in the future. For this reason, in the DVD standard to which much attention is drawn as a next-generation video recording medium for home use, no proposal has yet been made which would support the recording capacity of the ROM medium on the RAM medium having the same medium size as the ROM medium.

If the same linear recording density and the same track pitch are used, it is possible to simply double the recording density by recording the information on both the land and the groove as compared to the case where the information is recorded only on one of the land and the groove. Hence, the method of recording the information on both the land and the groove is an extremely important method from the point of view of developing a high-density recording medium. It has been reported for the magneto-optic recording medium that the MSR described above can not only improve the linear recording density but also reduce crosstalk between the tracks, and various studies are being made on the possibility of applying the MSR to the information recording on both the land and the groove. However, the condition for realizing the MSR is complicated in that, for example, the reproducing laser power depends upon the linear velocity, a reproducing magnetic field is required in some cases, and at least three magnetic layers are required in some cases. Therefore, the MSR is uncertain as to the stability, and the realization is likely to increase the cost of the apparatus.

When the track pitch is reduced, the crosstalk caused by the mixing of a data signal from the adjacent region into the output signal becomes a problem. According to the conventional method which records the information on the land or records the information on the groove, the groove exists between two adjacent recorded lands or, the land exists between two adjacent recorded grooves. As a result, the adjacent regions recorded with the information are separated by a groove or a land, thereby suppressing the crosstalk. However, when recording the information on both the land and the groove, the regions recorded with the information are adjacent to each other, and the effects of the crosstalk on the reproducing characteristic is extremely large. A Japanese Laid-Open Patent Application No.8-7353 proposes selection of the depth of the groove so as to reduce the crosstalk from the land or the groove. According to this proposed method, in a case where the wavelength of the light is 680 nm, the numerical aperture of an objective lens used is 0.55 and the widths of the land and the groove are 0.7 $\mu$m, the crosstalk is reduced by setting the depth of the groove to approximately ⅙ the wavelength.

But even if the spot size of the light irradiated on the magneto-optic recording medium is the same, as the track pitch becomes narrower, there was a problem in that the crosstalk cannot be reduced sufficiently in the case of a groove having the depth on the order of approximately ⅙ the wavelength. In addition, compared to the normal case where the depth of the groove of the magneto-optic recording medium is ⅛ the wavelength, there also were problems in that a carrier level of the signal decreases and a level of a push-pull signal which is used as a tracking error signal also decreases in the case of the groove having the depth on the order of approximately ⅙ the wavelength.

On the other hand, it has been reported that the condition for reducing the crosstalk in the proposed method, that is, the setting of the depth of the groove of the magneto-optic recording medium, easily changes depending on the Kerr ellipticity, spherical aberration and focus error of the objective lens, and the like.

SUMMARY OF THE INVENTION

Accordingly, it is an object of the present invention to provide a novel and useful optical information storage unit in which the problems described above are eliminated.

Another and more specific object of the present invention is to provide an improved optical information storage unit which can stably reproduce a signal recorded on a land and a groove of a recording medium, without putting a special load on the recording medium.

Still another object of the present invention is to provide an optical information storage unit which records information on boh a land and a groove and/or reproduces information from both the land and the groove of an optical recording medium, comprising a first optical system, including a first light source and a first phase compensation means, detecting light from the land of the optical recording medium, and a second optical system, including a second light source and a second phase compensation means, detecting light from the groove of the optical recording medium, where the first and second phase compensation means have mutually different phase compensation quantities. According to the optical information storage unit of the present invention, it is possible to realize an optimum phase compensation with respect to both the land and the groove. By using two independent optical systems with phase compensation conditions which are optimized with respect to the land and the groove, the crosstalk caused by the signal from the adjacent groove or land will not fall within the phase compensation conditions and the signal amplitude from the adjacent groove or land is reduced thereby. Therefore, by using the optical information storage unit of the present invention, it is possible to effectively reduce the crosstalk.

Other objects and further features of the present invention will be apparent from the following detailed description when read in conjunction with the accompanying drawings.

DETAILED DESCRIPTION OF THE PREFERRED EMBODIMENTS

Figure 1:
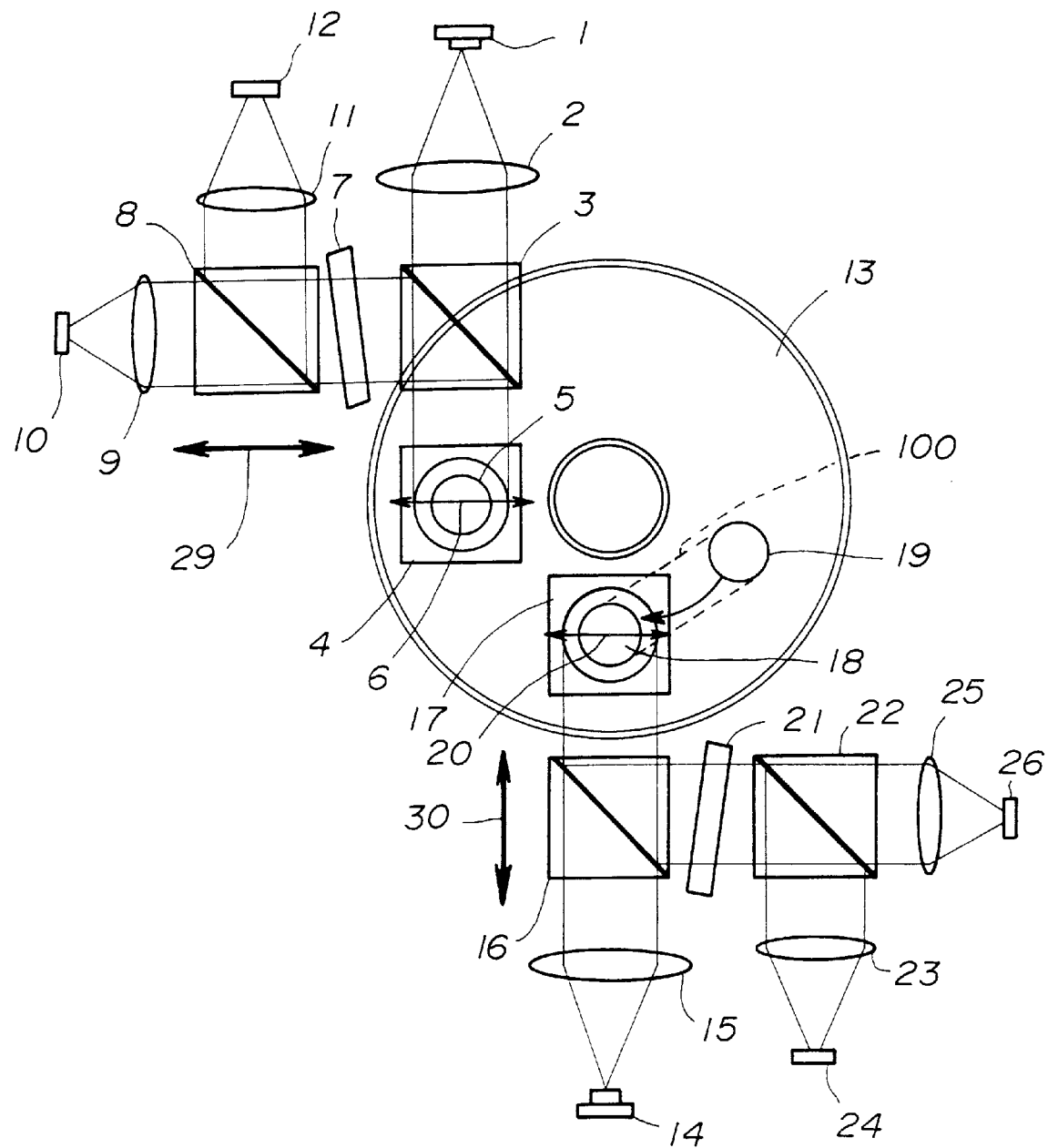
FIG. 1 is a diagram showing the construction of an optical system of an embodiment of an optical information storage unit according to the present invention.

First, a description will be given of the operating principle of the present invention.

In an optical information storage unit according to the present invention which records information on and/or reproduces information from both a land and a groove of an optical recording medium, an electrical vector of a light beam is set perpendicular to a direction in which a recorded signal flows when reproducing the signal from the land, and the electrical vector of the light beam is set parallel to the direction in which the recorded signal flows when reproducing the signal from the groove. In addition, magnetic Kerr effect detecting optical systems are provided to reproduce a magneto-optic signal, and a means having different phase compensation quantities is used to detect the signal from the land or the groove using one of the phase compensation quantities. It is important that the polarization control of the irradiating light beam at the time of the signal reproduction can easily be carried out. Hence, in the present invention, the object is realized by using two optical information detecting optical systems, one for reproducing the signal from the land and one for reproducing the signal from the groove.

In other words, exclusive optical information detecting optical systems are allocated for the signal reproduction from the land and the signal reproduction from the groove, and a phase compensation means is provided for each optical information detecting optical system, where the phase compensation quantity of the phase compensation means is different for the signal reproduction from the land and for the signal reproduction from the groove.

In addition, the electrical vector of the light irradiated on the optical recording medium is perpendicular to the direction in which the recorded signal flows in the land signal reproducing optical information detecting optical system, and the electrical vector of the light irradiated on the magneto-optic recording medium is parallel to the direction in which the recorded signal flows in the groove signal reproducing optical information detecting optical system, so that it is possible to realize a stable signal reproduction independent of a substrate material used for the optical recording medium.

Moreover, an output of a light source of one of the optical information detecting optical systems is made high so that it may be used for the recording, while an output of a light source of the other optical information detecting optical system is made low, so as to minimize the cost increase associated with the optical information storage unit.

Furthermore, the shorter the output wavelength of the light source having the low output, the more advantageous it is when reproducing the signal from a high-density optical recording medium exclusively for signal reproduction and consisting of a single spiral track.

But since the plate thickness of the optical recording medium differs depending on the kind of optical recording medium, an objective lens selection mechanism may be provided so as to use an objective lens having a numerical aperture of 0.6, for example, when reproducing the signal from an optical recording medium having a thin plate thickness of 0.6 mm, for example, and using an objective lens having a numerical aperture of 0.55, for example, when reproducing the signal from an optical recording medium having a plate thickness of 1.2 mm, for example, in the optical information detecting optical system having the light source with the low output or the short output wavelength.

A description will now be given of an embodiment of an optical information storage unit according to the present invention, by referring to FIGS. 1 through 4.

Figure 2:
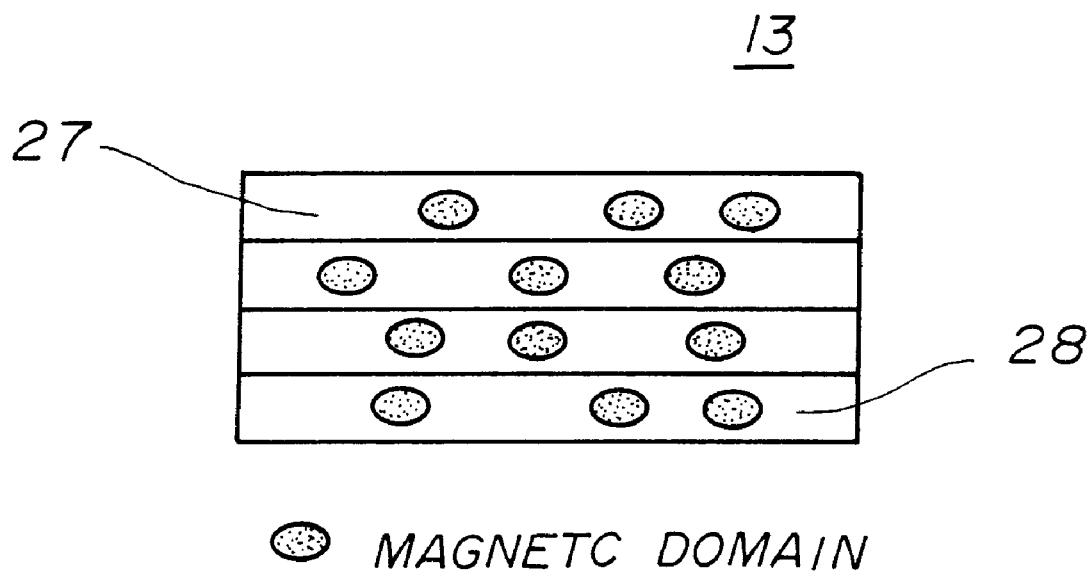
FIG. 2 is a plan view showing a part of a disk-shaped optical recording medium for explaining the positional relationship of a land and a groove of the disk-shaped optical recording medium.

FIG. 1 is a diagram showing the construction of an optical system of this embodiment of the optical information storage unit according to the present invention. FIG. 2 is a plan view showing a part of a disk-shaped optical recording medium for explaining the positional relationship of a land and a groove of the disk-shaped optical recording medium.

In FIG. 1, a laser beam emitted from a high-output type semiconductor laser 1 and having a wavelength of 680 nm is converted into parallel light by a collimator lens 2, and reaches a polarization beam splitter 3. This polarization beam splitter 3 has transmitting and reflecting characteristics such that transmittances Tp and Ts of the polarization beam splitter 3 with respect to p-polarized light component and s-polarized light component and reflectivities Rp and Rs of the polarization beam splitter 3 with respect to the p-polarized light component and the s-polarized light component are respectively set to satisfy Tp:Rp=80:20 and Ts:Rs=2.98.

The light transmitted through the polarization beam splitter 3 is directed to an objective lens 5 via a mirror 4. The objective lens 5 has a numerical aperture (NA) of 0.55 with respect to an optical recording medium having a plate thickness of 1.2 mm. The light which is converged to a diffraction limit by the objective lens 5 is irradiated on a disk-shaped optical recording medium 13 which is a magneto-optic recording medium in this embodiment. The electrical vector of the laser beam irradiated on the magneto-optic recording medium 13 is perpendicular to a direction in which the recorded signal flows, and is used to read the magneto-optic signal recorded on a land 27 of the magneto-optic recording medium 13 shown in FIG. 2.

The light reflected by the magneto-optic recording medium 13 passes through the objective lens 5 again, and again reaches the polarization beam splitter 3 where the amplitude of the reflected light is divided such that a transmitted component and a reflected component are obtained. The reflected component passes through a ½ wave plate 7 which is inclined with respect to an optical axis of the incoming light for giving a certain phase difference and making a phase compensation, and reaches a polarization beam splitter 8 which splits the reflected component into a p-polarized light component which is transmitted through the polarization beam splitter 8 and a s-polarized light component which is reflected by the polarization beam splitter 8. The p-polarized light component and the s-polarized light component pass through convergent lenses 9 and 11, respectively, and are converged on photodetectors 10 and 12, respectively, where a photo-electric conversion takes place. Photo-electric conversion signals are detected as the magneto-optic signal which is reproduced from the land 27 by use of a differential amplifier (not shown) by a known means. The entire optical system having the construction described above which is used for the land signal reproduction moves in a moving direction 29.

On the other hand, a laser beam emitted from a low-output type semiconductor laser 14 and having an output wavelength of 635 nm is converted into parallel light by a collimator lens 15, and reaches a polarization beam splitter 16. This polarization beam splitter 16 has transmitting and reflecting characteristics such that transmittances Tp and Ts of the polarization beam splitter 16 with respect to p-polarized light component and s-polarized light component and reflectivities Rp and Rs of the polarization beam splitter 16 with respect to the p-polarized light component and the s-polarized light component are respectively set to satisfy Tp:Rp=80:20 and Ts:Rs=2.98.

The light transmitted through the polarization beam splitter 16 is directed to an objective lens 18 via a mirror 17. The objective lens 18 has a numerical aperture of 0.55 with respect to an optical recording medium having a plate thickness of 1.2 mm. The light which is converged to a diffraction limit by the objective lens 18 is irradiated on the magneto-optic recording medium 13. The electrical vector of the laser beam irradiated on the magneto-optic recording medium 13 is parallel to the direction in which the recorded signal flows, and is used to read the magneto-optic signal recorded on a groove 28 of the magneto-optic recording medium 13 shown in FIG. 2. The light reflected by the magneto-optic recording medium 13 passes through the objective lens 18 again, and again reaches the polarization beam splitter 16 where the amplitude of the reflected light is divided such that a transmitted component and a reflected component are obtained. The reflected component passes through a ½ wave plate 21 which is inclined with respect to an optical axis of the incoming light for giving a certain phase difference and making a phase compensation, and reaches a polarization beam splitter 22 which splits the reflected component into a p-polarized light component which is transmitted through the polarization beam splitter 22 and a s-polarized light component which is reflected by the polarization beam splitter 22. The p-polarized light component and the s-polarized light component pass through convergent lenses 25 and 23, respectively, and are converged on photodetectors 26 and 24, respectively, where a photo-electric conversion takes place. Photo-electric conversion signals are detected as the magneto-optic signal reproduced from the groove 28 by use of a differential amplifier (not shown) by a known means. The entire optical system having the construction described above which is used for the groove signal reproduction moves in a moving direction 30.

Another objective lens 19 having a numerical aperture of 0.6 with respect to an optical recording medium having a plate thickness of 0.6 mm is provided on a known rotary sliding type two-dimensional actuator 100 which is used in the DVD system and controls the focusing and tracking of the objective lens 18. Accordingly, by controlling the rotary sliding type two-dimensional actuator 100 to switch the position of the objective lens 19 to the position of the objective lens 18 when reproducing a DVD having a plate thickness of 0.6 mm, it is possible to eliminate the problem of the spherical aberration caused by the difference between the plate thicknesses of different optical recording mediums.

Figure 5:
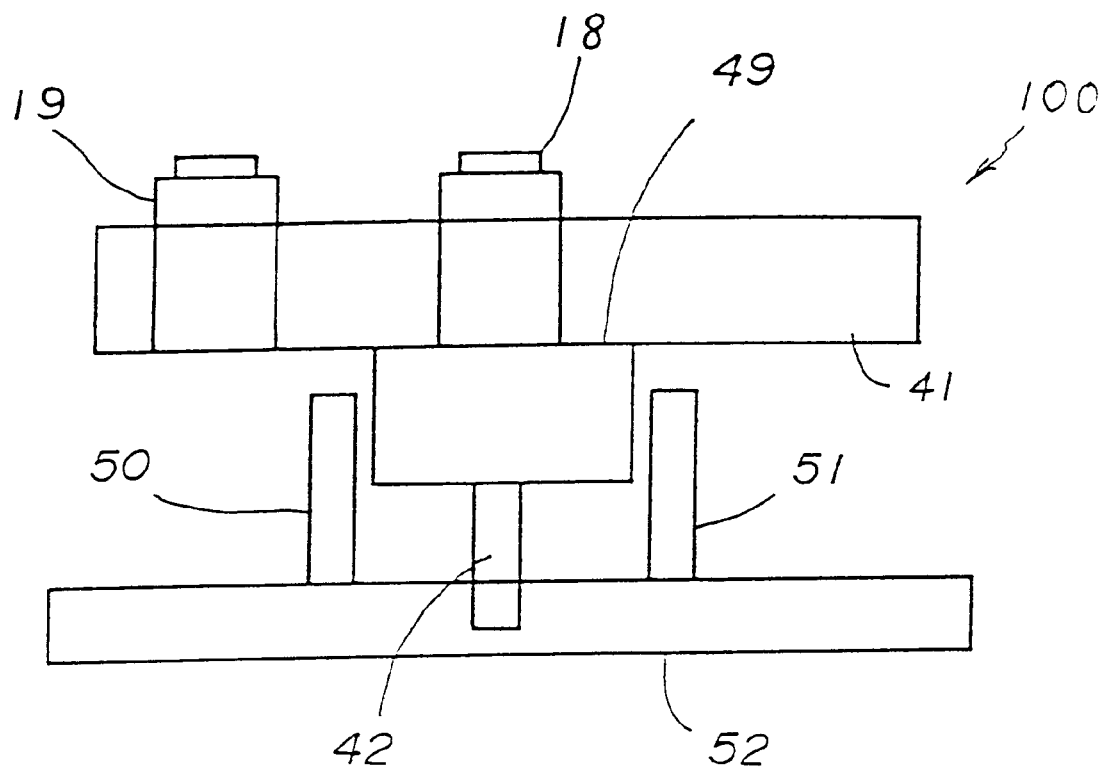
FIG. 5 is a diagram showing a structure related to a rotary sliding type two-dimensional actuator.

FIG. 5 is a diagram showing a structure related to the rotary sliding type two-dimensional actuator 100. Basically, up and down and rotary operations are possible. For example, a focus electromagnetic coil 49 is fixed on a holder 41 so as to surround a support pole 42, and magnets 50 and 51 are fixed on a base 52 about the support pole 42, where the base 52 is fixed on the support pole 42. In the rotary sliding type two-dimensional actuator 100 having this construction, the objective lens 18 and the objective lens 19 are arranged at the positions shown in FIG. 5 and are switched depending on the optical recording medium used.

Therefore, according to the optical information storage unit having the construction described above, it is possible to easily reproduce information from the magneto-optic recording medium recorded with the information on both the land and the groove, the CD or the DVD.

Next, a description will be given of the specifications of the magneto-optic recording medium which is used in the optical information storage unit according to the present invention to record the information on and reproduce the information from both the land and the groove.

A polycarbonate substrate having a land width and a groove width which are approximately the same and are 0.7 μm was used. An optical phase difference between the land surface and the groove surface of the polycarbonate substrate is approximately ⅛ the wavelength (laser wavelength of 680 nm), and SiN having a thickness of 90 nm was sputtered on this polycarbonate substrate. Then, a TbFeCo layer of 20 nm, a SiN layer of 22 nm, and an Al layer of 65 nm which becomes a reflection layer were successively formed. Further, a UV resin layer of approximately 10 μm was spin-coated as a protection layer.

A description will now be given of the method of recording the magneto-optic signal on the land and the groove of the magneto-optic recording medium. In this embodiment of the present invention, a light pulse synchronized to a clock was irradiated on the magnet-optic recording medium, and a pulse assisted electromagnetic modulation system was used which applies an alternating magnetic field modulated by a RLL1-7 code. The results of the reproducing characteristic obtained by this embodiment of the optical information storage unit according to the present invention will be described hereafter.

Figure 3:
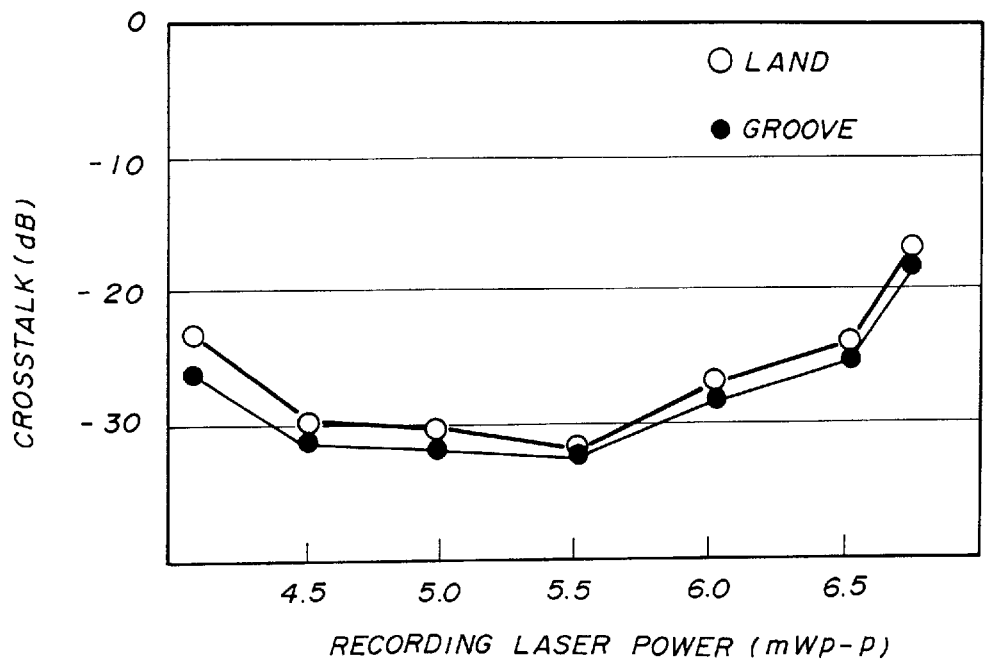
FIG. 3 is a diagram showing measured results of a recording laser power dependency of a crosstalk from an adjacent track.

FIG. 3 is a diagram showing measured results of a recording laser power dependency of a crosstalk from an adjacent track. In other words, FIG. 3 shows the dependency of the crosstalk between the land and the groove with respect to the peak power of the recording laser pulse. Magnetic domains, that is, marks having a mark length of 2 μm, were recorded on the land or the groove, and a carrier level Cm was measured. In addition, the groove or the land which is adjacent to the above described land or the groove was reproduced and a carrier level Camax was measured, and then a crosstalk Ct=Camax-Cm was obtained by denoting the higher carrier level by Camax. Hence, a carrier level obtained by directly reproducing the signal recorded on the land or the groove was subtracted from a carrier level obtained by reproducing the unrecorded land or the unrecorded groove.

In FIG. 3, a white circular mark indicates the crosstalk from the land, and a black circular mark indicates the crosstalk from the groove. It may be seen from FIG. 3 that the crosstalk caused by the signal recorded on the land or the groove shows a value of −25 dB or less with respect to either case for a large recording laser power range.

Figure 4:
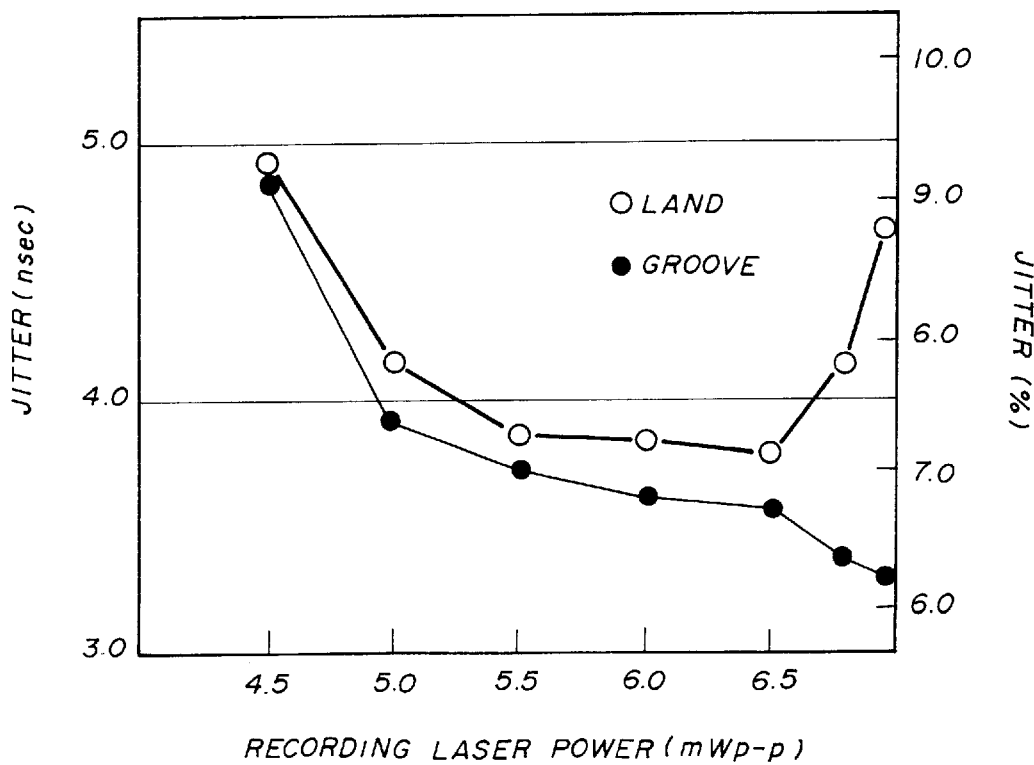
FIG. 4 is diagram showing measured results of recording laser power dependency of a 2 T jitter.

FIG. 4 is diagram showing measured results of a recording laser power dependency of a 2 T jitter.

The results shown in FIG. 4 were obtained by recording a random signal having a length 2 T=0.48 μm which is a minimum mark length in the RLL1-7 (RLL: Run Length Limited) code on the magneto-optic recording medium at a linear velocity of 4.5 m/s according to the pulse assisted magnetic field modulation system and then reproducing the random signal at a reproducing laser power of 1.3 mW.

In FIG. 4, a white circular mark indicates the jitter from the land, and a black circular mark indicates the jitter from the groove. The jitter in this case is defined as a value (%) which is obtained by multiplying 100 to a ratio of a standard deviation σ2 T of the 2 T signal with respect to a predetermined window width (time). In addition, the reproducing laser power refers to the laser power when the light is output from the objective lens.

As may be seen from FIG. 4, when the signal was recorded on both the land and the groove of the magneto-optic recording medium and then reproduced, it was confirmed that the jitter is 9% or less in a wide recording laser power range and that a large margin can be secured with respect to the jitter. Generally, if an average jitter between a clock and the data is 10% or less, it is judged that the jitter is within a sufficiently tolerable range for the data recording and reproduction. In this embodiment, even though the evaluation is made with respect to the jitter of 2 T which is the minimum mark length, a satisfactory result in which the jitter is 9% or less was obtained, and it was therefore confirmed that the data recording and reproduction are completely unaffected by the jitter from the practical point of view.

When the conventional optical information storage unit is used, that is, when the signal is reproduced from the land or the groove and no phase compensation described above is made, it was impossible to achieve a jitter of 10% or less in any laser power range. In addition, when the orientation of the ½ wave plate is not adjusted and optimized for each of the land and the groove, the crosstalk reduction and the improvement of the reproduced signal intensity become difficult, and it was similarly impossible to realize the jitter of 10% or less.

As described above in detail, it is possible to realize an optimum phase compensation with respect to both the land and the groove by using the optical information storage unit according to the present invention. By using two independent optical information detecting optical systems with phase compensation conditions which are optimized with respect to the land and the groove, the crosstalk caused by the signal from the adjacent groove or land will not fall within the phase compensation conditions and the signal amplitude from the adjacent groove or land is reduced thereby. Therefore, by using the optical information storage unit of the present invention, it is possible to effectively reduce the crosstalk.

Moreover, by providing an objective lens which can cope with an optical recording medium having another plate thickness on a two-dimensional actuator which is provided for the focusing and the tracking control, in one of the optical information detecting optical systems, it is possible to switch the objective lens and also reproduce the signal from a DVD, for example.

Further, the present invention is not limited to these embodiments, but various variations and modifications may be made without departing from the scope of the present invention.

What is claimed is:

1. An optical information storage unit which records information on both a land and a groove and/or reproduces information from both the land and the groove of an optical recording medium., comprising:

a first optical system, including a first light source and a first phase compensation means, detecting light from the land of the optical recording medium; and a second optical system, including a second light source and a second phase compensation means, detecting light from the groove of the optical recording medium, said first and second phase compensation means having mutually different phase compensation quantities.

2. The optical information storage unit as claimed in claim 1, wherein:

an electrical vector of light irradiated on the optical recording medium via said first optical system is perpendicular to a direction in which a signal recorded on the optical recording medium flows, and an electrical vector of light irradiated on the optical recording medium via said second optical system is parallel to the direction in which the signal recorded on the optical recording-medium flows.

3. The optical information storage unit as claimed in claim 1, wherein:

at least one of said first and second light sources produces an optical output capable of recording optical information on the optical recording medium.

4. The optical information storage unit as claimed in claim 3, wherein said first and second light sources produce outputs having mutually different wavelengths.

5. The optical information storage unit as claimed in claim 1, wherein:

at least one of said first and second optical systems having a light source which produces an output with a shorter wavelength or produces a low output further includes two kinds of objective lenses, and further comprising:

a switching mechanism switching the two kinds of objective lenses.

* * * * *